(12) United States Patent
Chow et al.

(10) Patent No.: US 6,981,352 B2
(45) Date of Patent: Jan. 3, 2006

(54) ROUND BALER LOW NET INDICATION

(75) Inventors: Mark K. Chow, Paoil, PA (US); Cecil R. Sudbrack, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/202,839

(22) Filed: Jul. 26, 2002

(65) Prior Publication Data

US 2004/0016204 A1   Jan. 29, 2004

(51) Int. Cl.
B65B 57/02 (2006.01)
(52) U.S. Cl. .............................. 53/64; 53/118; 53/587
(58) Field of Classification Search ................... 53/64, 53/118, 587, 67, 438, 505; 242/563, 563.2
See application file for complete search history.

(56) References Cited

U.S. PATENT DOCUMENTS

| | | | | |
|---|---|---|---|---|
| 3,081,958 A | * | 3/1963 | Kegg ...................... 242/534.2 |
| 3,129,680 A | * | 4/1964 | Doerner ...................... 112/278 |
| 3,991,692 A | * | 11/1976 | Papajewski et al. ........ 112/278 |
| 4,021,002 A | * | 5/1977 | Meihofer ................ 242/563.2 |
| 4,180,007 A | * | 12/1979 | Peterson et al. ............ 112/278 |
| 4,212,257 A | * | 7/1980 | Herron et al. ............... 112/278 |
| 4,214,542 A | * | 7/1980 | Odermann .................. 112/278 |
| 4,422,402 A | * | 12/1983 | Ogihara ..................... 116/67 A |
| 4,620,184 A | * | 10/1986 | Nedstedt ...................... 340/675 |
| 4,697,402 A | | 10/1987 | Anstey et al. |
| 4,956,968 A | | 9/1990 | Underhill |
| 4,998,961 A | | 3/1991 | Anderson et al. |
| 5,109,652 A | | 5/1992 | Viaud et al. |
| 5,349,806 A | | 9/1994 | Swearingen et al. |
| 5,388,504 A | | 2/1995 | Kluver |
| 5,551,218 A | | 9/1996 | Henderson et al. |
| 5,687,548 A | * | 11/1997 | McClure et al. ............... 53/399 |
| 5,692,365 A | | 12/1997 | Meyer et al. |
| 5,758,982 A | * | 6/1998 | Yoshida et al. ............. 400/708 |
| 6,035,773 A | | 3/2000 | Rempe |
| 6,079,324 A | | 6/2000 | Feraboli et al. |
| 6,092,478 A | * | 7/2000 | Simakrai et al. ............ 112/278 |
| 6,145,292 A | | 11/2000 | Underhill |
| 6,164,050 A | | 12/2000 | Vande Ryse et al. |
| 6,209,450 B1 | | 4/2001 | Naaktgeboren et al. |
| 6,247,291 B1 | | 6/2001 | Underhill |
| 6,412,726 B2 | * | 7/2002 | Inana et al. ............... 242/348.4 |
| 6,651,408 B1 | * | 11/2003 | McClure ....................... 53/587 |
| 2002/0029542 A1 | | 3/2002 | Davis et al. |

* cited by examiner

Primary Examiner—Stephen F. Gerrity
Assistant Examiner—Paul Durand
(74) Attorney, Agent, or Firm—John William Stader

(57) ABSTRACT

A round baler comprising: a housing; a bale chamber receiving cut crop material; a bale forming apparatus for bale forming; a wrapping apparatus comprising a wrapping material supply roll that provides wrapping material from the supply roll to wrap about the bale, and a sensor member disposed on a pivoting sensor arm member so the sensor member abuts an outer surface of the wrapping material stored on the supply roll, and the sensor arm member moves between first position and second positions; and a low wrapping material indication system comprising a sensor disposed to sense at least the second position of the sensor arm member corresponding to a minimum thickness of the wrapping material stored on the supply roll, wherein the sensor generates a signal to indicate that the thickness of the wrapping material is at the minimum thickness when the sensor arm member is at the second position.

8 Claims, 4 Drawing Sheets

ROUND BALER LOW NET INDICATION

FIELD OF THE INVENTION

This invention relates to round balers that include a bale wrapping apparatus for wrapping a harvested crop material with a wrapping material, such as a net or twine, to produce shaped bales of the harvested crop material for convenient transport and storage. More particularly, the present invention relates to a round baler with bale wrapping apparatus, wherein the round baler also includes a low wrapping material indication system for providing an indication signal to an operator of the round baler, thereby signifying that the wrapping material, whether a net material or a twine material stored by the bale wrapping apparatus, is running low. In this manner, the operator is made aware of the impending need to provide more wrapping material for the bale wrapping apparatus.

BACKGROUND OF THE INVENTION

Round balers (commonly known simply as "balers") of the prior art generally have a bale forming chamber defined by walls of a housing and an apron formed by an array of side-by-side belts, transverse slats trained on chains, a plurality of rolls or a combination of these various elements (e.g. rolls and belts). Cut crop material, such as straw, hay, and the like, is picked up from the ground by a crop pick-up assembly as the baler moves along a field. A feeder assembly then takes the cut crop material and feeds it into the bale forming chamber, which may be a fixed or variable chamber, where the cut crop material accumulates and is compressed by a bale forming apparatus to form a cylindrical package of cut crop material, commonly referred to as a "bale." The bale, while it is in this compacted and formed state, is wrapped by a bale wrapping apparatus with a wrapping material such as twine, a net, a plastic film, or the like. The end result is a wrapped, form-sustaining bale, typically round or cylindrical in shape, that is ejected from the bale forming chamber onto the ground for subsequent handling.

A baler that has a pick-up assembly, a rotatable conveyer for feeding the cut crop material into a bale forming chamber, a fixed bale forming chamber (i.e., a chamber that does not vary in size), and a bale wrapping apparatus is disclosed in U.S. Pat. No. 6,164,050 to Vande Ryse et al., which is incorporated herein in its entirety by reference.

U.S. Pat. No. 6,079,324 to Feraboli et al., which is also incorporated herein in its entirety by reference, discloses a round baler having a variable bale forming chamber. Although not specifically disclosed by the reference, round balers having a variable bale forming chamber utilize a conventional bale wrapping apparatus in the typical manner.

One problem with the prior art balers is that there is no mechanism for indicating when the wrapping material stored by the bale wrapping apparatus is getting low. Typically, the wrapping material is manufactured and stored on a roll or reel so that the material, such as twine or net material, has a different and noticeable color change when the roll or reel is nearing the end of the material. In this manner, a person operating the baler can see that the wrapping material is running out by looking for a color change in the wrapping material via a window in a wrapping material storage box, or by seeing a color change of the wrapping material on the bales as they are deposited on the ground during baling operations. However, this requires that the baler operator remains vigilant, continually looking for color changes in the wrapping material through the storage box window or by watching for the color change in the wrapping material on the deposited bales. Due to other distractions during machine operation, baler operators may miss the color change and the baler will run out of wrapping material in the middle of a baling operation.

Hence, there is a need for a more convenient and effective mechanism for indicating when the amount of wrapping material carried by the bale wrapping mechanism is running low. More particularly, there is a need for a low wrapping material indication mechanism that generates a visual and/or auditory signal on a display in the operator's panel conveniently located relative to where the operator is positioned in the tractor.

An object of the present invention is to provide an improved baler that includes an improved mechanism for indicating when the amount of wrapping material carried by the bale wrapping mechanism is running low that overcomes the disadvantages of the prior art balers.

A further object of the present invention is to overcome the limitations of the prior art balers that utilize relatively crude methods for indicating when the amount of wrapping material is running low in the baler.

A still further object of the present invention is to provide a baler with a more convenient and effective mechanism for indicating when the amount of wrapping material carried by the bale wrapping mechanism is running low.

Yet another object of the present invention is to provide a baler with a mechanism for indicating when the amount of wrapping material carried by the bale wrapping mechanism is running low by generating a visual and/or auditory signal at a display on the operator's panel conveniently located relative to where the operator is positioned in the tractor.

Another object of the present invention is to provide a baler with a mechanism for indicating when the amount of wrapping material carried by the bale wrapping mechanism is running low that is both durable and reliable.

A still further object of the present invention is to provide a baler with a mechanism for indicating when the amount of wrapping material carried by the bale wrapping mechanism is running low that is practical and cost effective to manufacture.

SUMMARY OF THE INVENTION

In accordance with the above objectives, the present invention provides a round baler comprising: a housing; a bale chamber defined by walls of the housing; a bale forming apparatus disposed to form a bale of cut crop material inside the bale chamber; and a wrapping apparatus disposed adjacent the bale chamber to wrap material around the bale. The wrapping apparatus comprises a wrapping material supply roll rotatingly connected to the housing, and a sensor arm member having one end pivotally connected to the housing, a sensor member disposed on another end of the sensor arm member to abut an outer surface of wrapping material stored on the wrapping material supply roll. The sensor arm member moves between a first position and a second position corresponding to a preselected minimum thickness of wrapping material stored on the supply roll. The baler according to the present invention further comprises a low wrapping material indication system comprising a sensor arranged to sense at least the second position of the sensor arm member, wherein the sensor generates a signal to indicate at least when the sensor arm member is at the second position.

In accordance with another embodiment of the present invention, the sensor is a potentiometer that senses an incremental or decremental position of the sensor arm member as the sensor arm member moves between the first position and the second position, and wherein the sensor generates a signal incrementally or decrementally indicating the thickness of the wrapping material stored on the wrapping material supply roll.

In accordance with a still further embodiment of the present invention, the sensor is electrically connected to transmit the signal to a display assembly that displays wrapping material supply information. The information can be displayed by a gauge dial or graphically or alphanumerically.

In accordance with yet another embodiment of the present invention, the sensor is a magnetic sensor.

In accordance with a still further embodiment of the present invention, the sensor is electrically connected to transmit the signal to a display assembly that displays wrapping material supply information via a visual device, an audio device, or by simultaneous activation of a visual device and an audio device.

Further objects, features and advantages of the present invention will become apparent from the Detailed Description of Preferred Embodiments, which follows, when considered together with the attached drawings.

DETAILED DESCRIPTION OF THE INVENTION

Figure 1:
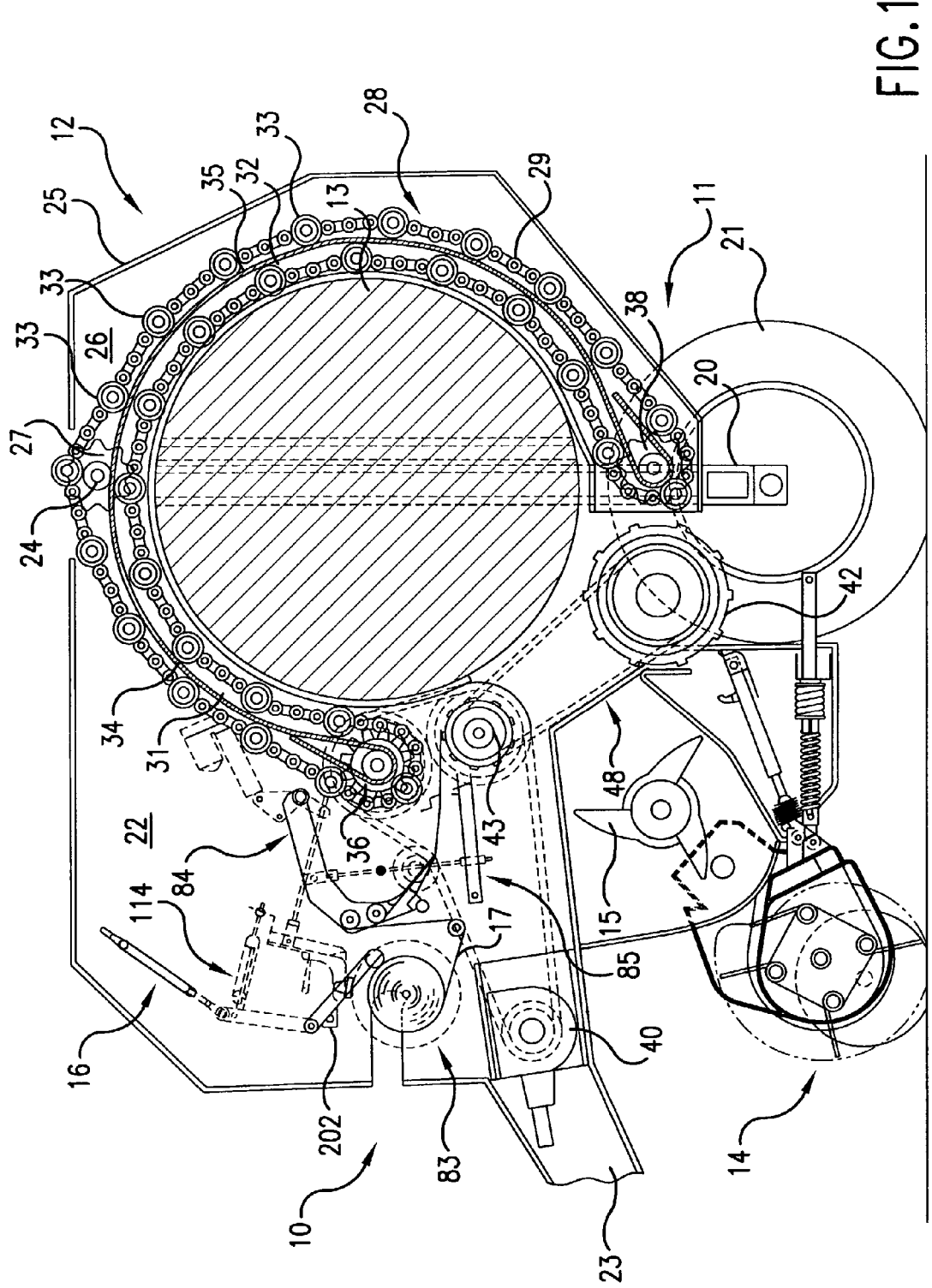
FIG. 1 is a cutaway side elevational view of a round baler in accordance with the present invention.

The preferred embodiments of the invention will now be described with reference to the Figures in which like parts are indicated by like reference numerals. The apparatus of the present invention as shown in FIG. 1 is a round baler 10 including a main frame or housing 11 and a bale forming chamber 12 mounted onto or inside of housing/frame 11. The bale forming chamber 12 is illustrated as a fixed bale forming chamber for forming a geometrical package 13 of crop material known as a "bale." Preferably, the bale produced has a cylindrical shape; however, one skilled in the art would appreciate that the present invention can be practiced on balers that produce rectangular bales and can be practiced by round balers having a variable bale forming chamber.

Main frame 11 includes a main support beam 20 on which a pair of wheels 21 (only one shown) is rotatably affixed. A tongue 23 extends from a front portion of frame 11 to provide a conventional hitch connection for connecting to a tractor or other work vehicle. Frame 11 also includes a pair of sidewalls 22 (only one shown) between which the bale forming chamber 12 extends. A pair of stub shafts 24 (only one shown) pivotally connect tailgate 25, which pivotally rotates about the stub shafts 24 from the closed position shown in FIG. 1 to an open position as is conventionally known so that a completed wrapped bale can be discharged to the ground. Tailgate 25 includes a pair of tailgate sidewalls 26 (only one shown) that are coextensive with sidewalls 22.

Baler 10 also includes a pick-up assembly 14 for picking up a cut crop material, such as straw, hay, and the like, from a field and delivering it to a rotatable conveyer 15, which feeds the cut crop material into the bale forming chamber 12 while the baler moves across a field. The pick-up assembly operates in a conventionally known manner. A bale wrapping apparatus 16 disposed within housing/frame 11 so as to be near the bale forming chamber 12 serves to wrap wrapping material 17, such as net, twine or plastic sheet, around the bale 13 within the bale forming chamber.

The bale forming chamber 12 is defined primarily by an apron assembly 28 for moving the cut crop material about the bale forming chamber 12 and into a bale, wherein the apron assembly includes a pair of support chains 29. Chains 29 are mounted to travel along a continuous path, the inner run of which is defined on sidewalls 22 and tailgate sidewalls 26 by front and rear sections 31, 32 of a continuous chain guide track that separates during bale discharge. Apron assembly 28 also includes a plurality of tubular parallel crop-engaging slats 33 extending between the chains 29 to provide a cage-like periphery for the bale forming chamber 12. Rear sections 34, 35 of a continuous cylindrical bale chamber wall provide an inner run for the apron assembly 28. Rear sections 34, 35 are also separable during bale discharge and are mounted between sidewalls 22 and tailgate sidewalls 26.

Drive sprockets 36 mounted between sidewalls 22, idler sprockets 27 mounted between sidewalls 22 on stub shafts 24, and idler sprockets 38 operatively engage chains 29 to move the apron assembly 28 by use of a conventional chain drive system (depicted in phantom outline outwardly of sidewall 22) coupled to gearbox 40 as is generally known in the art.

The bale forming chamber 12 is further defined by the outer conveying surfaces of floor roll 42 and stripper roll 43, which are driven by the conventional drive means coupled to gearbox 40 to rotate in a clock-wise direction. Rolls 42, 43 convey crops into the bale forming chamber 12 as a bale is forming.

The formation of a bale is achieved in the conventional manner wherein the pick-up assembly 14 picks up cut crop material from a field and delivers the material to conveyor 15, which in turn delivers the material to the bale chamber inlet 48 defined by floor roll 42 and stripper roll 43. The slats 33 of the apron assembly 28 subsequently engage and rotate the cut crop material thereby moving the cut crop material about the bale forming chamber 12 to form the bale 13 as described in U.S. Pat. No. 6,164,050, which is incorporated herein by reference in its entirety.

Figure 2:
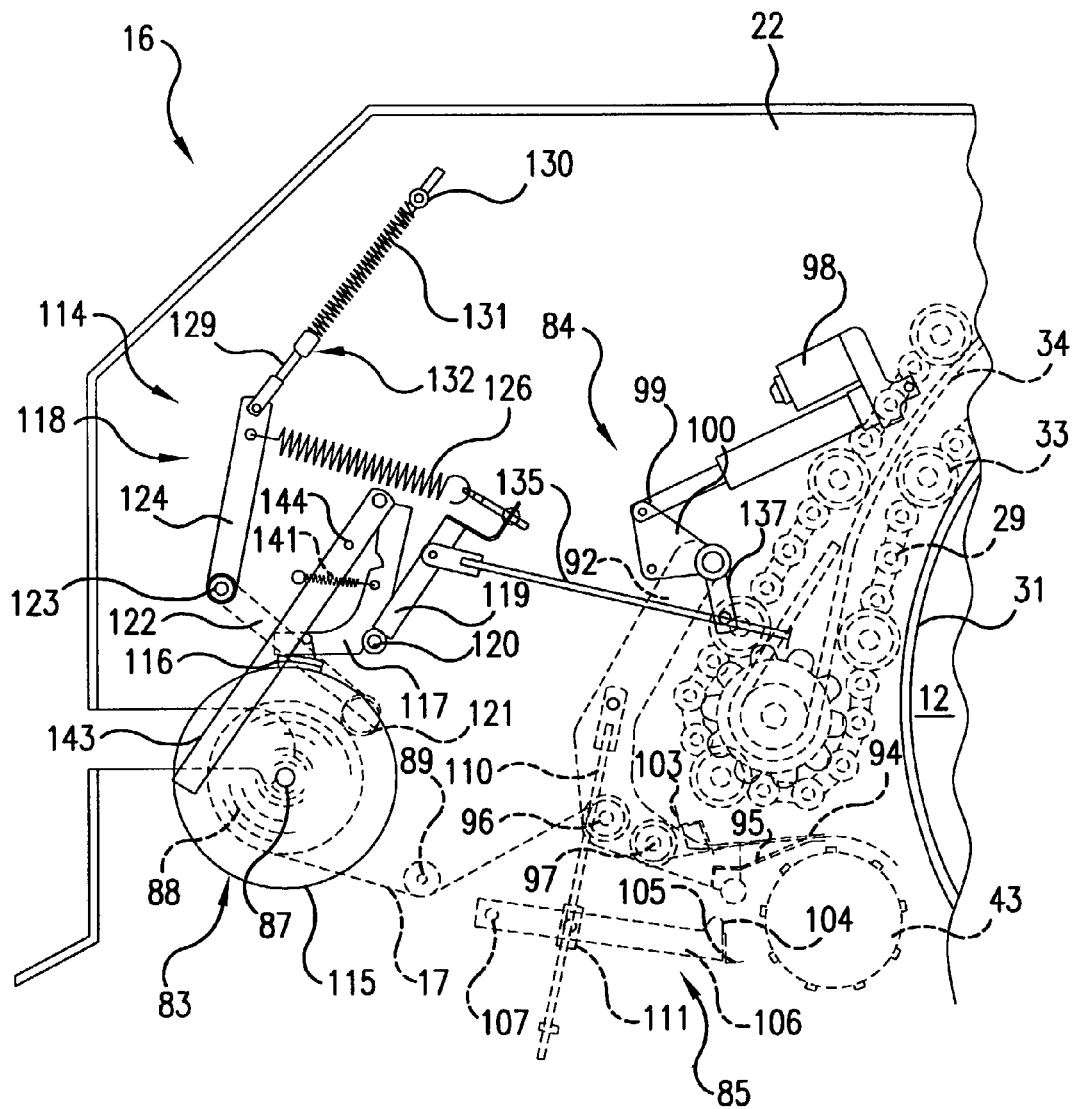
FIG. 2 is an enlarged partial elevational view of the wrapping apparatus in accordance with the present invention having a full supply roll of wrapping material at the start of a wrapping operation.

Once the bale 13 has been formed, the wrapping apparatus 16 shown in FIGS. 1 and 2 is employed in the conventional manner to wrap a wrapping material 17 around the bale to produce a completed wrapped bale that is ready for discharge from the baler 10. FIG. 2 shows the wrapping apparatus 16 at the start of a wrapping cycle. Wrapping apparatus 16 includes a wrapping material supply assembly 83, a dispensing mechanism 84 that receives wrapping material 17 from the supply assembly and dispenses it to the bale forming chamber 12, and severing assembly 85 for severing the wrapping material after it has been wound around the bale 13.

Figure 3:
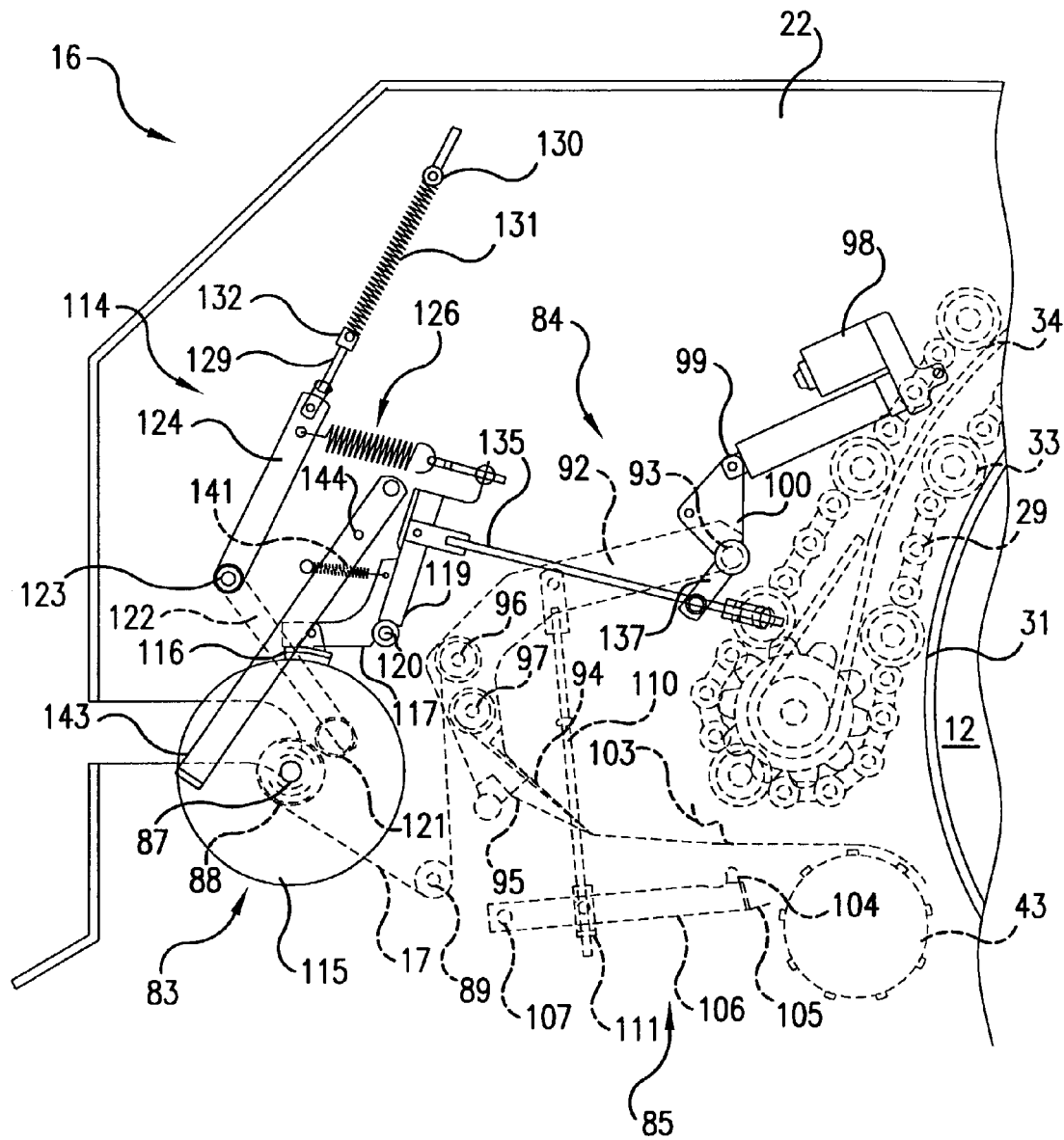
FIG. 3 is an enlarged partial elevational view of the wrapping apparatus shown in FIG. 2, but having a nearly exhausted supply roll after wrapping operations.

As shown in FIGS. 2 and 3, wrapping material supply assembly 83 includes a support shaft 87 rotatably mounted in apertures (not shown) in sidewalls 22 so that shaft 87 may rotate when a supply roll 88 having wrapping material 17 stored thereon is mounted onto shaft 87 and is secured thereto with barbs or a pair of cones. Preferably, wrapping material 17 is a bale wrapping net material; however, plastic sheet material or twine can also be used. As shown in FIG. 2, wrapping material 17 is guided along idler roll 89 to dispensing mechanism 84.

Dispensing mechanism 84 includes a pair of parallel frame members 92 (only one shown) fixedly secured to a rotatably supported cross tube 93 extending between sidewalls 22, and upper and lower clamping members 94, 95 having tips for grasping wrapping material 17 as described in U.S. Pat. No. 4,956,968 to Underhill, which is incorporated herein in its entirety by reference. Two spreader rolls 96, 97 extending between frame members 92 are provided with appropriate surface elements, such as spirals, for spreading side strips of the dispensed wrapping material 17 as is conventionally known. Wrapping material 17 issued from supply roll 88 is guided from idler roll 89 along a path around spreader rolls 96, 97 to clamping members 94 and 95.

Wrapping material severing assembly 85 includes a shear bar 103 fixedly mounted between sidewalls 22 and a transverse knife 104 affixed to mounting member 105 extending between a pair of parallel knife support arms 106 that are rotatably mounted at fixed pivot points 107 on the inside of sidewalls 22. A coupling link 110 is pivotally attached at its upper end to one of the frame members 92 and at its lower end to a sliding bushing 111 pivotally attached to one of the knife support arms 106.

Wrapping apparatus 16 further comprises a drag control mechanism 114 for maintaining the wrapping material under tension between the net supply assembly 83 and the bale forming chamber 12. Control mechanism 114 includes a steel friction disc 115 secured to an outer end of shaft 87 so that the periphery of disc 115 engages a brake shoe 116 provided with a lining of friction material. Brake shoe 116 is affixed to drag lever 117 that is pivotally attached to sidewall 22 by stud 120. Stud 120 also pivotally attaches load arm 119 to sidewalls 22. The upper arm of lever 117 can be pushed forward by load arm 119 that is connected to the driving means 99 of electrical actuator assembly 98 via release rod 135 connected to release arm 137. Release arm 137 is affixed to cross tube 93, which is fixedly secured to one end of link member 100. Another end of link member 100 is pivotally attached to driving means 99. The activation of the electrical actuator assembly 98 to initiate a wrapping operation after the formation of the bale in the bale forming chamber 12 is electronically controlled by a deliberate or automatic signal as described in U.S. Pat. No. 5,687,548 to McClure et al. and U.S. Pat. No. 5,692,365 to Meyer et al., both of which are incorporated herein by reference in their entirety.

Forward movement of the upper arm of lever 117 effects a braking engagement of the brake shoe 116 with disc 115 whereas rearward movement of the upper arm of lever 117 disengages the brake shoe with the friction disc, thereby allowing supply roll 88 to rotate and issue wrapping material 17 therefrom. Spring 141 ensures that the upper portion of lever 117 is biased towards the forward position.

Lever 143 provides a manual brake release mechanism that is needed when the baler runs out of wrapping material and supply roll 88 needs to be replaced. Lever 143 includes stud 144 that is welded thereto so that when lever 143 is manually pushed rearward (i.e., towards tailgate 25), stud 144 engages a notch in the upper portion of lever 117 so that the upper portion of lever 117 moves rearward thereby disengaging the brake shoe 116 from disc 115.

The drag control mechanism 114 also includes a supply roll diameter sensing assembly 118 that includes a transverse sensor member 121 disposed at the end of a forwardly and upwardly extending sensor arm 122 so that sensor member 121 engages the periphery of the net supply roll 88. Arm 122 is attached to the inner end of a pivot shaft 123 extending through sidewall 22. Pull arm 124 is fixedly attached to the outer end of shaft 123 and tension spring 126 is connected between arm 124 and load arm 119 so as to bias the brake shoe 116 to frictionally engage disc 115. Rod 129 is pivotally attached at a lower end to pull arm 124 and the upper end is slidingly received in a hole of pivot 130 that is attached to side wall 22. A compression spring 131 is mounted over rod 129 and is compressed between pivot 130 and nut 132 so as to exert a force on pull arm 124. The amount of force exerted on pull arm 124 by compression spring 131 can be varied by moving the position of nut 132 on rod 129.

The diameter of the supply roll 88 is sensed by sensor member 121 on sensor arm 122. Sensor member 121 is forced against the roll surface by tension spring 126, a portion of this spring force is countered by the force of compression spring 131, which pushes pull arm 124 forwardly so that sensor member 121 generates no significant braking effect on supply roll 88. The roll diameter defines the position of pull arm 124 and hence the extension of tension spring 126. The force of spring 126 is transferred upon load arm 119 and upon drag lever 117, which pushes the brake shoe 116 against friction disc 115.

One skilled in the art would appreciate that a full supply roll 88 generates maximum spring extension and consequently a maximum braking force for the rotation of roll shaft 87. As the roll diameter decreases during wrapping operations, spring 126 contracts as shown in FIG. 3 and the braking force on the periphery of friction disc 115 decreases proportionally. Thus, the wrapping apparatus 16 is provided with a mechanism for maintaining a substantially constant stretching force or tension on the wrapping material 17 during all wrapping operations.

When supply roll 88 is almost completely empty as shown in FIG. 3, load arm 124 has reached its rearmost position and is now extending towards pivot 130. The spring forces of spring 131 are assumed completely by pivot 130 and load arm shaft 123 such that spring 131 has no effect on the contact force between roll-engaging sensor member 121 and the supply roll 88. During this condition, the only force holding sensor member 121 to the surface of supply roll 88 is the force generated by tension spring 126. Hence, the decreasing spring force exerted by the tension spring 126 on the roll surface is compensated by a corresponding decrease in the effective spring force of compression spring 131.

Figure 4:
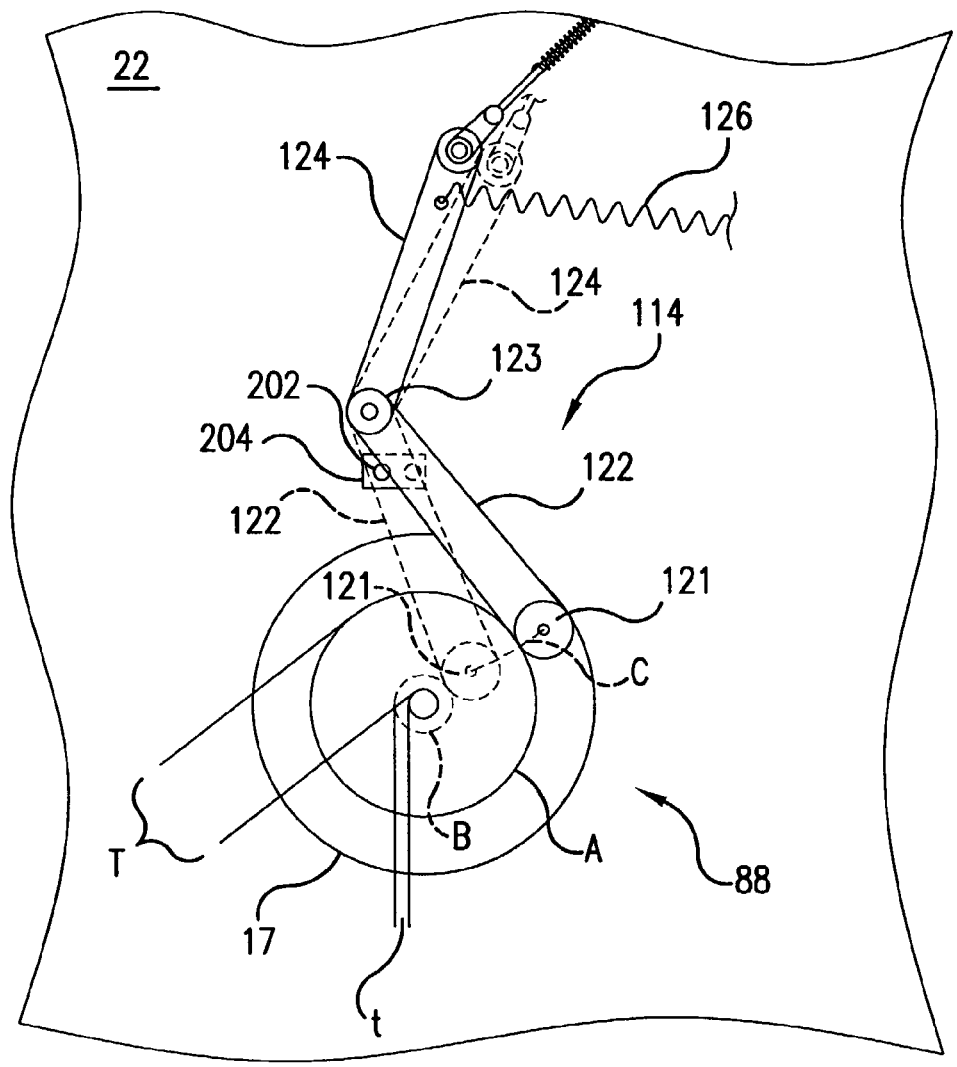
FIG. 4 is an enlarged view of a portion of the drag control mechanism and the sensor of the low wrapping material indication system.

From FIGS. 2 and 3, it is evident that as the wrapping material is dispensed from supply roll 88 the diameter of the supply roll gradually decreases and position of sensing arm 122 changes. FIG. 4 illustrates drag control mechanism 114 and its relationship to supply roll 88 as the roll goes from being fully loaded with wrapping material 17 having a thickness T and providing an outer surface A at the beginning of a wrapping operation to the condition wherein the roll is almost spent of wrapping material 17 having a thickness t and that provides an outer surface B (shown in outline). When the roll 88 is fully loaded, the sensor arm 122, sensor member 121 and pull arm 124 are said to be in the "first position." When the roll 88 reaches an almost depleted state corresponding to the remaining wrapping material having a thickness t, sensor arm 122, sensor member 121 and pull arm 124 are said to be in the "second position" shown in outline in FIG. 4. Correspondingly, as sensor arm 122 and sensor member 121 move from the first position to the second position, the sensor arm and the sensor member move along arc C. A sensor can detect this movement.

Figure 5:
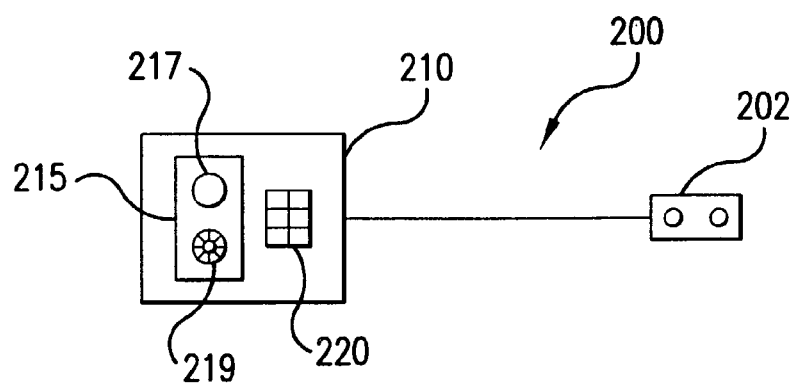
FIG. 5 is a schematic of the low wrapping material indication system.

In accordance with the present invention, as shown in FIGS. 4 and 5, the baler 10 includes a low wrapping material indication system 200 comprising position sensor 202 disposed on sidewall 22 near to, or in the proximity of, sensor arm 122 so that sensor 202 is activated and generates a signal when the sensor arm 122 reaches the second position. As shown in FIG. 5, sensor 202 is electronically connected to a display assembly 210 located on the operator's panel mounted in a tractor (not shown), so that an operator can sense a warning indicator 215. Display assembly 210 is an electronic device having an internal adjustable controller.

Preferably, sensor 200 is an elongated magnetic sensor that senses a metal portion of sensor arm 122. Sensor 200 is preferably mounted in a slot 204 formed in sidewall 22 and proximate to shaft 123 and positioned so that the sensor will generate a signal when the sensor arm 122 is at or near the second position. Warning indicator 215 is preferably some form of visual device 217, such as a light or an LED; however, audio devices 219 such as a horn, a bell, or other audio warning device can be used as the warning indicator 215. In addition, the warning indicator 215 could be practiced as a visual device 217 simultaneously activated in combination with an audio device 219; each of these embodiments providing wrapping material supply information to the operator. Thus, when sensor arm 122 reaches the second position, corresponding to the supply roll 88 having only a thickness t of wrapping material 17 remaining, sensor 202 generates a signal that is transmitted to display assembly 210 so that a warning indicator 215 produces a warning signal, being either visual, audio, or a combination of visual and auditory stimuli, that can be appreciated by the operator of the baler 10. Display assembly 210 includes a wrapping material thickness control portion 220 that is electronically configured to adjust and control, in a predetermined and/or programmable manner, the value of thickness t of the remaining wrapping material at which sensor 202 will generate a signal. In this manner, the operator selectively predetermines how much wrapping material is remaining on supply roll 88 when the low wrapping material indication system 200 generates a signal that there is a low amount of wrapping material remaining on the supply roll.

In an alternate embodiment of the present invention, sensor 202 is a potentiometer having linkages connected to sensor arm 122 so that the potentiometer continuously senses the diameter of the wrapping material on supply roll 88 directly via the position of sensor arm 122. In this manner, sensor 122 can continuously provide display assembly 210 with data signals indicating the diameter of the wrapping material on supply roll 88 by continuously sensing the position of sensor arm 122. The controller (i.e. computer or electronic calculating device) of display assembly 210 continuously monitors the signal from the potentiometer to calculate and display wrapping material supply information on a gauge or bar graph or alphanumeric display that serves as the visual device 217.

While the present invention and its operation has been described with reference to certain preferred embodiments, one of ordinary skill in the art will recognize that additions, deletions, substitutions, modifications, and improvements can be made while remaining within the spirit and scope of the present invention as defined by the appended claims.

What is claimed is:

1. A round baler comprising:
   a housing including a plurality of walls defining a bale chamber that receives a cut crop material;
   a bale forming apparatus disposed to form a bale of cut crop material inside the bale chamber;
   a wrapping material supply roll rotatingly connected to the housing;
   a sensor arm member having one end pivotally connected to the housing, wherein the sensor arm member moves between a first position and a second position corresponding to a preselected minimum thickness of wrapping material stored on the supply roll and the preselected minimum thickness is greater than zero;
   a sensor member disposed on another end of the sensor arm member to abut an outer surface of wrapping material stored on the wrapping material supply roll; and
   a sensor arranged to sense the position of the sensor arm member, wherein the sensor generates a signal to indicate at least when the sensor arm member is at the second position.

2. A round baler as recited in claim 1, wherein the sensor is a potentiometer that senses an incremental or decremental position of a portion of the sensor arm member as the sensor arm member moves between the first position and the second position, and wherein the sensor generates a signal incrementally or decrementally indicating the thickness of the wrapping material stored on the wrapping material supply roll.

3. A round baler as recited in claim 2, wherein the sensor is electrically connected to transmit the signal to a display assembly that displays wrapping material supply information.

4. A round baler as recited in claim 3, wherein the display assembly displays wrapping material supply information on a gauge dial.

5. A round baler as recited in claim 3, wherein the display assembly displays wrapping material supply information graphically.

6. A round baler as recited in claim 3, wherein the display assembly displays wrapping material supply information via an alphanumeric display.

7. A round baler as recited in claim 1, wherein the sensor is a magnetic sensor.

8. A round baler as recited in claim 1, wherein the sensor is electrically connected to transmit the signal to a display assembly that displays wrapping material supply information via a visual device, an audio device, or by simultaneous activation of a visual device and an audio device.

* * * * *